United States Patent

Le Mounier

[15] 3,674,213
[45] July 4, 1972

[54] CUTTING HEAD FOR THERMOCHEMICAL MACHINING

[72] Inventor: Jean Le Mounier, Auxonne, France

[73] Assignee: L'Air Liquide, Societe Anonyme Pour L'Etude et L'Exploitation Des Procedes Georges Claude, Paris, France

[22] Filed: Oct. 14, 1970

[21] Appl. No.: 80,632

[30] Foreign Application Priority Data

Oct. 21, 1969    France ................................. 6935976

[52] U.S. Cl. ........................ 239/425, 239/428, 239/552
[51] Int. Cl. ......................................................... B05b 7/06
[58] Field of Search ............. 239/418, 419, 419.3, 422, 423, 239/424, 424.5, 425, 428, 552

[56] References Cited

UNITED STATES PATENTS

| | | | |
|---|---|---|---|
| 2,367,316 | 1/1945 | Skinner | 239/419 X |
| 1,888,385 | 11/1932 | Jenkins | 239/419 X |
| 1,980,636 | 11/1934 | Roumillat | 239/424.5 |
| 2,210,402 | 8/1940 | Gaines | 239/422 X |
| 3,389,861 | 6/1968 | Nakanishi et al. | 239/424 X |

FOREIGN PATENTS OR APPLICATIONS 352,292   10/1922   Germany ............................. 239/425

Primary Examiner—M. Henson Wood, Jr.
Assistant Examiner—Edwin D. Grant
Attorney—Young & Thompson

[57] ABSTRACT

In this cutting head for thermochemical machining by an oxygen jet surrounded by heating flames, a curtain of oxygen is interposed between the flames and the jet. The curtain is supplied by the cutting oxygen and prevents the pollution of the oxygen jet by the flames. A cutting nozzle divides the oxygen stream into the central, cutting jet and the protective curtain.

10 Claims, 1 Drawing Figure

PATENTED JUL 4 1972
3,674,213
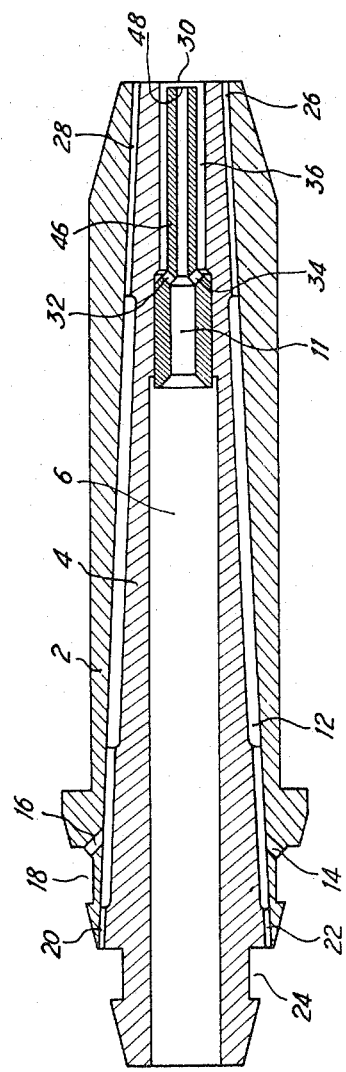
INVENTOR
JEAN LE MOUNIER
BY Young & Thompson
ATT'YS

CUTTING HEAD FOR THERMOCHEMICAL MACHINING

The present invention relates to cutting heads for thermochemical machining, effected by means of an oxygen jet, called "cutting," arriving by way of an axial passage, leaving a central orifice of the head and enclosed by flames due to the combustion of a mixture of combustible gas and combustion-supporting gas, this mixture leaving the cutting head through an annular slot or through a ring of passages surrounding the central orifice. The machining in question is, for example, a cutting, scarfing, deseaming or desurfacing operation.

In the known arrangements of this type, a central jet of cutting oxygen is enclosed by a continuous or interrupted ring of flames, serving to bring the metal which is to be machined to a temperature for it to burn briskly in the oxygen jet. These arrangements have the disadvantage that the gasses of the flames dilute the cutting oxygen, and this reduces the quantity of oxidized metal and makes irregular the surface which bounds the unremoved metal.

The cutting head according to the invention permits these disadvantages to be overcome. It does in fact produce a curtain of oxygen at lower speed than that of the cutting oxygen, the said curtain separating the cutting oxygen from the heating flames. It is characterized in that the axial passage contains a cutting nozzle on the side of the gas outlet, which nozzle divides the stream of oxygen into a central jet and into a supplementary outlet around the central jet, there being no communication connecting the supplementary outlet with the annular slot or the ring of passages, or with a conduit supplying gas to the annular slot or the ring of passages. In this way, the oxygen curtain does not exist during the heating period, and this avoids a cooling of the bath during this period.

The machining head as described is simple to construct and is also less expensive. It can replace the cutting head of an existing machining torch without any conversion of the remainder of the torch.

According to one preferred embodiment, the end of the cutting nozzle on the side of the gas outlet is by manufacture set back slightly on the end of the axial passage, for example, by a length of 0.5 or 1 mm. This precaution considerably increases the life of the cutting head, the strongest heating being produced at the end of the axial passage which brings the cutting oxygen to its outlet orifice during the periods when the heating flames exist, but when the supply of cutting oxygen is zero. If this setting back were not provided, the end of the cutting nozzle would change in shape and the operation of the cutting head would become inefficient.

The accompanying drawing represents as a longitudinal section, in diagrammatic form and as a non-limiting example, one embodiment of a cutting head according to the invention. This cutting head is intended to be mounted in a machining torch which supplies it with gas in the manner which will be hereinafter set forth and which is usual for gas torches or blowpipes.

Starting from the outside, the head illustrated comprises :
— a heating skirt 2 ;
— a heating nozzle 4, with axial passage 6 ;
— a cutting nozzle 46, disposed in a part of the passage 6 terminating on the side where the gases discharge; the cutting nozzle consists of a material which is a very good heat conductor, for example, copper. A bore 11 extends throughout the length of the nozzle 46.

The skirt 2 and the nozzle 4 comprise, at the end where gases arrive, that is to say, on the left in the drawing, three conical bearings on which is tightened a torch body (not shown) and through which body the gases separately reach the cutting head.

Longitudinal chambers 12 are provided between the skirt 2 and the nozzle 4. Passages 14, 16 connect these chambers to an external groove 18 supplied with acetylene through the torch body.

Other passages 20,22 connect the chambers 12 to an external groove 24, which is supplied with heating oxygen through the torch body. The gases arriving by way of the passages 14, 16, 20, 22 are mixed in the chambers 12 and leave through passages such as 26, 28. On leaving, the mixture is ignited and produces the heating flames.

The cutting oxygen is supplied through the torch body in the axial passage 6; it travels through the bore 11 and leaves by way of the central orifice 48 of the cutting nozzle. Some of the oxygen is deflected through bores 32, 34 formed in the wall of the cutting nozzle. These bores open into an annular space 36 between the cutting nozzle and the heating nozzle 4; leaving this space is a sheet of oxygen forming a protective curtain separating the heating flames from the cutting oxygen. Instead of causing the protective oxygen to leave through an annular slot, it can leave by way of passages. Moreover, the set of passages such as 26,28 can be replaced by an annular slot.

The cutting nozzle 46 is fixed to the heating nozzle 4 by expanding its portion upstream of the passages 32, 34, so as to ensure a very good thermal contact; the expansion could be replaced by welding.

The end 48 of the cutting nozzle is set back slightly in relation to the end 30 of the heating nozzle 4. The offsetting is of the order of a millimeter, the best results generally being obtained with an offsetting which is between 0.5 and 1 mm.

By way of example, using a cutting head of the type illustrated, with a diameter of 1.3 mm for an outlet orifice of the bore 11, a steel sheet with a thickness of 15 mm is cut at a speed of 45 m/h instead 30 m/h without a protective curtain. The gas supply pressures are : cutting oxygen : five bars; heating oxygen : 1.5 bars; acetylene : 0.160 bar.

The heads which are illustrated can be modified as regards their dimensions and their shapes without departing from the scope of the present invention. By way of example, the head 2,4,46 can be manufactured from one or two metal blocks, in which the necessary passages are drilled. As combustible gas, gases other than acetylene can be used, for example, propane, natural gas, a mixture based on methyl-acetylene, etc. These heads can serve for machining metals by removal of material by thermochemical procedure in accordance with various procedures : cutting of elements, scarfing or desurfacing of semi-finished products, etc.

The bores 32 and 34 through which the annular space 36 is supplied with oxygen can be replaced by other passages terminating in the bore 11 or in the passage 6 upstream of the cutting nozzle. For example, one or more grooves can be formed in the surface of the nozzle 4 or of the nozzle 46. The grooves 12 can be replaced by a single annular chamber.

The cutting heads according to the invention can be supplied with heating gases mixed before they are introduced into the head.

What I claim is:

1. In a torch head for thermochemical machining, comprising a body having therein an axial passage for cutting oxygen, said axial passage being bounded by a wall terminating in a central orifice on the outlet side of said passage, passage means spaced from and surrounding said axial passage, means for supplying cutting oxygen to said axial passage and means for supplying said passage means spaced from the axial passage with combustible gas and with combustion-supporting gas; the improvement comprising a nozzle affixed in said axial passage to the wall thereof, said nozzle dividing said axial passage adjacent the outlet thereof into a central jet and an auxiliary outlet disposed around said central jet, whereby oxygen flowing through said passage is divided by said nozzle into a high velocity stream of cutting oxygen which issues from said central jet and a curtain of lower velocity oxygen which issues from said auxiliary outlet and is parallel to said central jet, the end of said nozzle adjacent said outlet being set back from said central orifice.

2. A torch head as claimed in claim 1, wherein said end of the nozzle is set back by a distance of about 0.5 to 1.0 mm.

3. A torch head as claimed in claim 1, the external diameter of said nozzle adjacent its outlet end being smaller than the internal diameter of the surrounding portion of said wall thereby to define an annular space between said nozzle and said wall, said annular space terminating in said auxiliary outlet, and at least one duct interconnecting the interior of said nozzle and said annular space.

4. A torch head as claimed in claim 3, said at least one duct comprising at least one hole through the nozzle.

5. A torch head as claimed in claim 4, said at least one hole having a total cross-sectional area less than the cross-sectional area of said annular space thereby to reduce the velocity of gas that emerges from said auxiliary outlet relative to the velocity of gas that emerges from said central jet.

6. A torch head as claimed in claim 3, said nozzle being secured to the wall of said axial passage with good thermal contact by welding in the region of the nozzle which is not surrounded by said annular space.

7. A torch head as claimed in claim 3, said nozzle being secured to the wall of said axial passage with good thermal contact by crimping in the region of the nozzle which is not surrounded by said annular space.

8. A torch head as claimed in claim 3, said nozzle being secured to the wall of said axial passage with good thermal contact by expanding against said wall in the region of the nozzle which is not surrounded by said annular space.

9. A torch head as claimed in claim 8, said nozzle being of copper.

10. A torch head as claimed in claim 1, said nozzle having high heat conductivity.

* * * * *